US011483067B2

(12) United States Patent
Matsumoto et al.

(10) Patent No.: US 11,483,067 B2
(45) Date of Patent: Oct. 25, 2022

(54) OPTICAL TIME DOMAIN REFLECTOMETER, TEST METHOD OF OPTICAL TRANSMISSION LINE, AND TEST SYSTEM OF OPTICAL TRANSMISSION LINE

(71) Applicant: NEC Corporation, Tokyo (JP)

(72) Inventors: Yuhei Matsumoto, Tokyo (JP); Takefumi Oguma, Tokyo (JP); Kazunori Shinya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/270,567

(22) PCT Filed: Apr. 25, 2019

(86) PCT No.: PCT/JP2019/017581

§ 371 (c)(1),
(2) Date: Feb. 23, 2021

(87) PCT Pub. No.: WO2020/044659

PCT Pub. Date: Mar. 5, 2020

(65) Prior Publication Data

US 2021/0194577 A1 Jun. 24, 2021

(30) Foreign Application Priority Data

Aug. 30, 2018 (JP) ............................ JP2018-161342

(51) Int. Cl.
*H04B 10/40* (2013.01)
*H04B 10/071* (2013.01)
*G01M 11/00* (2006.01)

(52) U.S. Cl.
CPC ....... *H04B 10/071* (2013.01); *G01M 11/3136* (2013.01); *G01M 11/3145* (2013.01); *H04B 10/40* (2013.01)

(58) Field of Classification Search
CPC . H04B 10/071; H04B 10/40; G01M 11/3145; G01M 11/3136
See application file for complete search history.

(56) References Cited

U.S. PATENT DOCUMENTS 5,066,118 A 11/1991 Buerli
5,131,743 A 7/1992 Kaneko et al.
(Continued)

FOREIGN PATENT DOCUMENTS

CN 102761363 A 10/2012
CN 204578539 U 8/2015
(Continued)

OTHER PUBLICATIONS

International Search Report for PCT Application No. PCT/JP2019/017581, dated Jul. 30, 2019.
(Continued)

*Primary Examiner* — Dzung D Tran

(57) ABSTRACT

An optical detection unit detects a return light and outputs a detection signal. An optical multiplexer/demultiplexer outputs the monitoring light to the optical transmission line, and outputs the return light to the optical detection unit. A processing unit detects a first timing at which the detection signal becomes less than a first threshold value, detects a second timing at which the detection signal becomes less than a second threshold value, and calculates a first change rate of the detection signal in a period between the first and second timings. The processing unit changes the first and second threshold values to calculate the first change rate for a plurality of periods, and, when a second change rate between the first change rates in two adjacent periods is greater than a threshold value, either of the first and second timings in one period is detected as the breakage position.

12 Claims, 13 Drawing Sheets

(56) References Cited

U.S. PATENT DOCUMENTS

| | | | | |
|---|---|---|---|---|
| 5,365,328 | A | 11/1994 | Anderson | |
| 6,674,518 | B1 | 1/2004 | Asher et al. | |
| 2004/0135992 | A1* | 7/2004 | Munro | G01S 17/10 356/4.01 |
| 2013/0088718 | A1* | 4/2013 | Perron | G01M 11/3136 356/445 |
| 2016/0142136 | A1 | 5/2016 | Izumi | |
| 2016/0187223 | A1* | 6/2016 | Preston | H04B 10/2575 356/73.1 |
| 2017/0180041 | A1* | 6/2017 | Yi | H04B 10/0791 |
| 2019/0197846 | A1* | 6/2019 | Englund | G08B 13/186 |

FOREIGN PATENT DOCUMENTS

| | | | |
|---|---|---|---|
| CN | 107483106 | A | 12/2017 |
| JP | H04-083140 | A | 3/1992 |
| JP | H04-132931 | A | 5/1992 |
| JP | H05-099707 | A | 4/1993 |
| JP | H07-063644 | A | 3/1995 |
| JP | 2001-074598 | A | 3/2001 |
| JP | 2003-042901 | A | 2/2003 |
| JP | 2006-064480 | A | 3/2006 |
| JP | 2008-003068 | A | 1/2008 |
| JP | 2011-038785 | A | 2/2011 |
| JP | 2011-191147 | A | 9/2011 |
| JP | 2013-148561 | A | 8/2013 |
| JP | 2014-011554 | A | 1/2014 |
| WO | 2013/176505 | A1 | 11/2013 |

OTHER PUBLICATIONS

Japanese Office Action for JP Application No. 2020-540051 dated Aug. 2, 2022 with English Translation.

Chinese Office Communication for CN Application No. 201980055376.3 dated Aug. 31, 2022 with English Translation.

* cited by examiner

START
S101
Vth_i=Vth0
T_i=T0
S102
Vth_i+1=Vth_i+ΔV_i
S103
OUTPUT MONITORING LIGHT
S104
MEASURE T_i+1
S105
ΔT=|T_i−T_i+1|
S106
R_i=ΔV_i/ΔT
S107
T_i=T0?
YES
NO
S108
ΔR_i=|R_i=R_i−1|
S109
ΔR_i>ΔRth?
NO
YES
S110
i=i+1
S111
CALCULATE BREAKAGE POSITION CORRESPONDING TO T_i
S112
OUTPUT ALARM
END

OPTICAL TIME DOMAIN REFLECTOMETER, TEST METHOD OF OPTICAL TRANSMISSION LINE, AND TEST SYSTEM OF OPTICAL TRANSMISSION LINE

This application is a National Stage Entry of PCT/JP2019/017581 filed on Apr. 25, 2019, which claims priority from Japanese Patent Application 2018-161342 filed on Aug. 30, 2018, the contents of all of which are incorporated herein by reference, in their entirety.

TECHNICAL FIELD

The present invention relates to an optical time domain reflectometer, a test method of an optical transmission line, and a test system of an optical transmission line.

BACKGROUND ART

An optical time domain reflectometer referred to as an OTDR is generally used to detect breakage of an optical transmission line consisting of an optical fiber or the like. The optical time domain reflectometer outputs an optical pulse, which is a monitoring light, to the optical transmission line, and monitors a return time and intensity of a backscattered light (so-called a return light) from each part of the optical transmission line to detect a breakage position. Since the return light does not return from the breakage position and thereafter, the breakage position of the optical transmission line can be determined by detecting a timing at which the intensity of the return light decreases.

For example, it has been proposed that an OTDR waveform determination method capable of selecting not only the breakage of the optical transmission line but also an abnormal part due to a wound state of a fiber constituting the optical transmission line (PTL1).

Further, as described above, there are known various methods of detecting a position of a failure position by outputting a pulse light (Monitoring light) to an optical transmission line and measuring a time at which a reflected light from the failure position returns (PTL2 and PTL3).

CITATION LIST

Patent Literature

PTL1: Japanese Unexamined Patent Application Publication No. 2011-38785

PTL2: Japanese Unexamined Patent Application Publication No. H4-132931

PTL3: Japanese Unexamined Patent Application Publication No. 2008-3068

SUMMARY OF INVENTION

Technical Problem

The general optical time domain reflectometer described above is used to determine the breakage position when breakage has occurred in the optical transmission line. In this case, the monitoring light is output to the optical transmission line, a curve indicating an intensity change of the return light is acquired, and a user determines a timing at which the intensity of the return light decreases, thereby determining the breakage position. However, in order to maintain the optical transmission line more reliably, it is desirable to automatically detect the breakage of the optical transmission line and notify the user of the detection result. Therefore, it is required to automatically detect the breakage of the optical transmission line and to detect the breakage position with high accuracy.

The present invention has been made in view of the aforementioned circumstances and aims to accurately and automatically detect a breakage position of an optical transmission line.

Solution to Problem

An aspect of the present disclosure is an optical time domain reflectometer including: a light source configured to output a monitoring light; an optical detection unit configured to detect a return light from an optical transmission line and output a detection signal indicating an intensity of the return light; an optical multiplexer/demultiplexer configured to output the monitoring light input from the light source to the optical transmission line, and output the return light input from the optical transmission line to the optical detection unit; a processing unit configured to detect a first timing at which a value of the detection signal becomes less than a first threshold value, detect a second timing at which the value of the detection signal becomes less than a second threshold value different from the first threshold value, and calculate a first change rate which is a change rate of the detection signal in a period between the first timing and the second timing, in which the processing unit: calculates the first change rates for a plurality of periods by changing the first threshold value and the second threshold value; and, when a second change rate that is a change rate between the first change rate in a first period and the first change rate in a second period adjacent to the first period is greater than a change rate threshold value, detects a position corresponding to either the first timing or the second timing in the first period as a breakage position of the optical transmission line.

An aspect of the present disclosure is a test method of an optical transmission line including: outputting a monitoring light to an optical transmission line; detecting a return light from the optical transmission line, and outputting a detection signal indicating an intensity of the return light; and detecting a first timing at which a value of the detection signal becomes less than a first threshold value, detecting a second timing at which the value of the detection signal becomes less than a second threshold value different from the first threshold value, and calculating a first change rate which is a change rate of the detection signal in a period between the first timing and the second timing, in which the first change rates for a plurality of periods are calculated by changing the first threshold value and the second threshold value; and, when a second change rate that is a change rate between the first change rate in a first period and the first change rate in a second period adjacent to the first period is greater than a change rate threshold value, a position corresponding to either the first timing or the second timing in the first period is detected as a breakage position of the optical transmission line.

An aspect of the present disclosure is a test system of an optical transmission line including: a first optical transmission apparatus configured to transmit and receive optical signals; a second optical transmission apparatus configured to transmit and receive the optical signals; an optical transmission line connecting the first optical transmission apparatus and the second optical transmission apparatus; and an optical time domain reflectometer connected to the first optical transmission apparatus and configured to test the optical transmission line; in which the optical time domain reflectometer includes: a light source configured to output a monitoring light; an optical detection unit configured to detect a return light from the optical transmission line and output a detection signal indicating an intensity of the return light; an optical multiplexer/demultiplexer configured to output the monitoring light input from the light source to the optical transmission line, and output the return light input from the optical transmission line to the optical detection unit; a processing unit configured to detect a first timing at which a value of the detection signal becomes less than a first threshold value, detect a second timing at which the value of the detection signal becomes less than a second threshold value different from the first threshold value, and calculate a first change rate which is a change rate of the detection signal in a period between the first timing and the second timing, in which the processing unit: calculates the first change rates for a plurality of periods by changing the first threshold value and the second threshold value; and, when a second change rate that is a change rate between the first change rate in a first period and the first change rate in a second period adjacent to the first period is greater than a change rate threshold value, detects a position corresponding to either the first timing or the second timing in the first period as a breakage position of the optical transmission line.

Advantageous Effects of Invention

According to the present invention, it is possible to accurately and automatically detect a breakage position of an optical transmission line.

DESCRIPTION OF EMBODIMENTS

Figure 1:
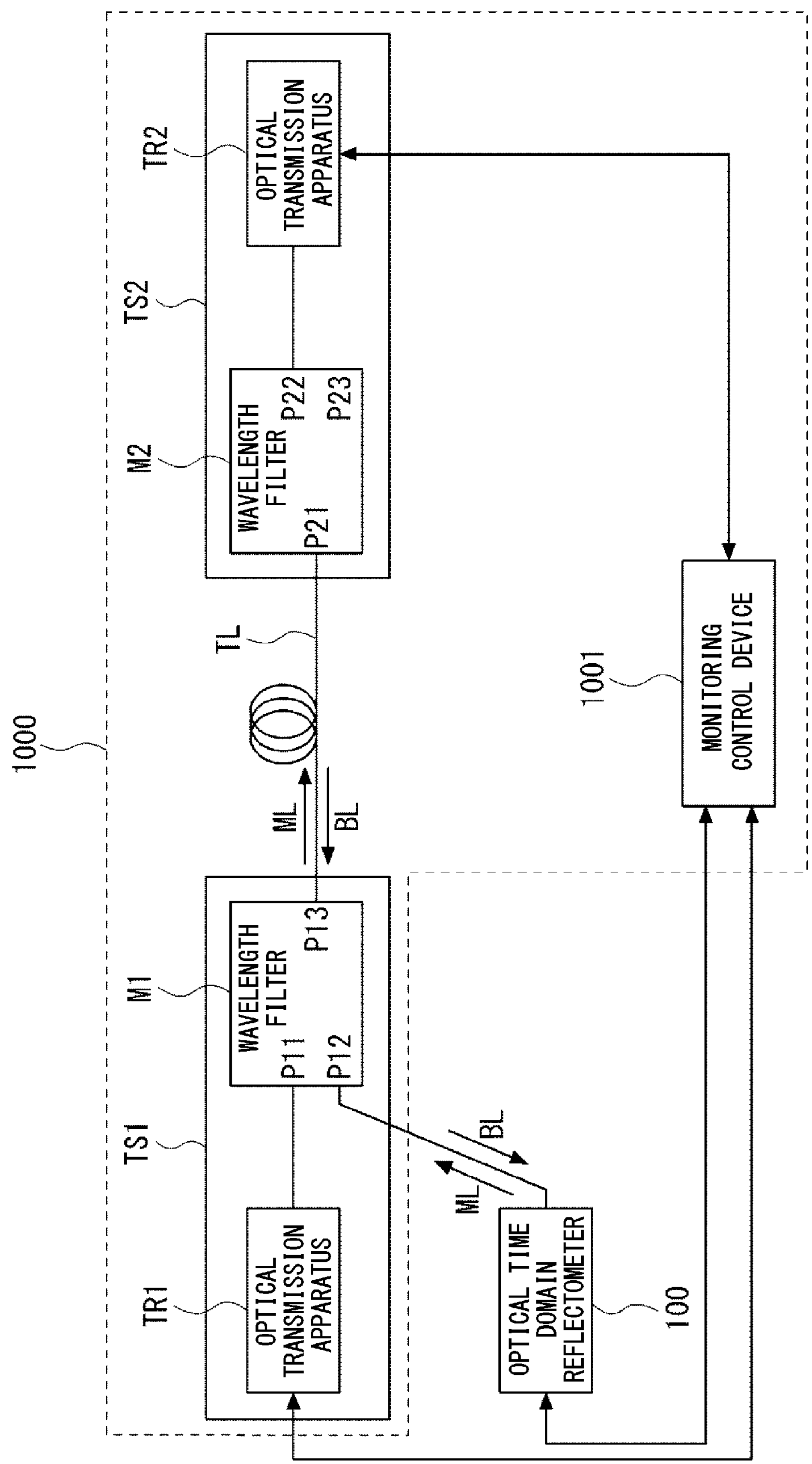
FIG. 1 is a diagram schematically showing an application example of an optical time domain reflectometer according to a first example embodiment.

Example embodiments of the present invention will be described below with reference to the drawings.

In the drawings, the same elements are denoted by the same reference numerals, and thus a repeated description is omitted as needed.

First Example Embodiment

An optical time domain reflectometer according to a first example embodiment will be described. The optical time domain reflectometer is connected to one of two terminal stations connected by an optical transmission line, for example, configured to output a monitoring light to the optical transmission line and detect a return light. FIG. 1 schematically shows an example of use of an optical time domain reflectometer 100 according to the first example embodiment. Here, an example of detecting breakage of an optical transmission line TL connecting a terminal station TS1 and a terminal station TS2 will be described. The terminal station TS1, the terminal station TS2, and a monitoring control apparatus 1001 constitute an optical communication network 1000. The optical time domain reflectometer 100 is connected to the optical communication network 1000 to constitute an optical transmission line test system together with the optical communication network 1000.

The terminal station TS1 includes an optical transmission apparatus TR1 (Also referred to as a first optical transmission apparatus) that is configured to be capable of transmitting and receiving optical signals and an optical wavelength filter M1. The optical wavelength filter M1 is configured as a two-input/one-output optical wavelength filter. The optical transmission apparatus TR1 is connected to one input of the optical wavelength filter M1 (Port P11). The optical time domain reflectometer 100 is connected to the other input of the optical wavelength filter M1 (Port P12). An output of the optical wavelength filter M1 (Port P13) is connected to the optical transmission line TL.

The terminal station TS2 includes an optical transmission apparatus TR2 (Also referred to as a second optical transmission apparatus) that is configured to be capable of transmitting and receiving optical signals and an optical wavelength filter M2. The optical wavelength filter M2 is configured as a one-input/two-output optical wavelength filter. An input of the optical wavelength filter M2 (Port P21) is connected to the optical transmission line TL. The optical transmission apparatus TR2 is connected to one output of the optical wavelength filter M2 (Port P22). Although the other output of the optical wavelength filter M2 (Port P23) is open in FIG. 1, various apparatuses can be connected as appropriate.

The optical time domain reflectometer 100 outputs a monitoring light ML to the optical transmission line TL through the optical wavelength filter M1, and detects a return light BL returned from the optical transmission line TL through the optical wavelength filter M1. The optical time domain reflectometer 100 is configured to detect the breakage of the optical transmission line TL by detecting an intensity of the return light BL. The optical time domain reflectometer 100 can notify, for example, the monitoring control device 1001 of the detection result of the breakage of the optical transmission line TL. The monitoring control device 1001 may instruct one or both of the optical transmission apparatuses TR1 and TR2 to stop transmitting and receiving the optical signals when the optical transmission line has been broken.

Figure 2:
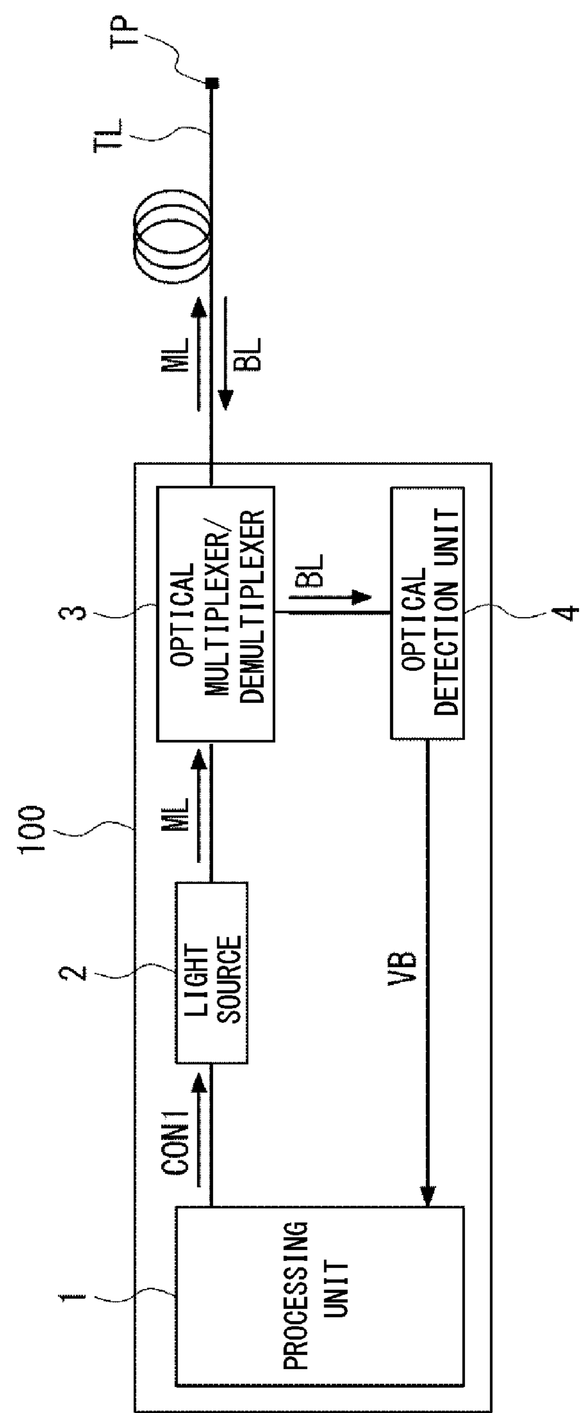
FIG. 2 is a diagram schematically showing a configuration of the optical time domain reflectometer according to the first example embodiment.

Next, the optical time domain reflectometer 100 will be specifically described. FIG. 2 schematically shows a configuration of the optical time domain reflectometer 100 according to the first example embodiment. The optical time domain reflectometer 100 includes at least a processing unit 1, a light source 2, an optical multiplexer/demultiplexer 3, and an optical detection unit 4. As described later, the processing unit 1 detects a breakage position of the optical transmission line TL based on a value of a detection signal VB. Therefore, in FIG. 2, the detection signal VB is indicated as being provided to the processing unit 1. However, this does not mean that the detection signal VB is directly input to the processing unit 1, and other signals generated based on the detection signal VB may be provided to the processing unit 1.

Figure 3:
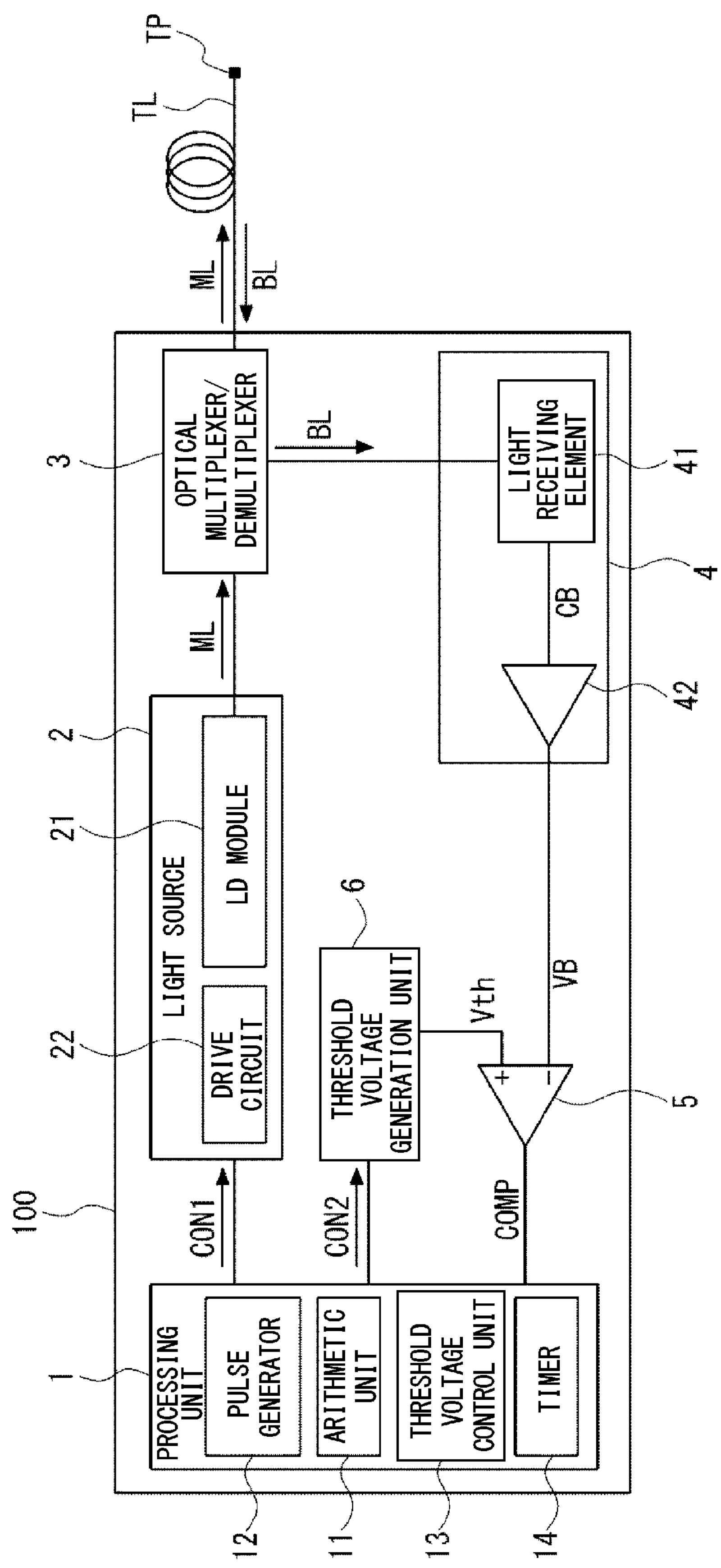
FIG. 3 is a diagram showing the configuration of the optical time domain reflectometer according to the first example embodiment in more detail.

FIG. 3 shows a configuration of the optical time domain reflectometer 100 according to the first example embodiment in more detail. As compared with FIG. 2, the optical time domain reflectometer 100 further includes a comparator 5 and a threshold voltage generation unit 6.

The processing unit 1 is configured to be capable of controlling an operation of the light source 2 by a control signal CON1. The processing unit 1 is configured to be capable of adjusting a threshold voltage Vth applied to one input of the comparator 5.

A configuration of the processing unit 1 will be described. The processing unit 1 includes an arithmetic unit 11, a pulse generator 12, a threshold voltage control unit 13, and a timer 14. The arithmetic unit 11 is configured to be capable of monitoring a comparison signal COMP output from the comparator 5, and controlling operations of the pulse generator 12, the threshold voltage control unit 13, and the timer 14.

The pulse generator 12 outputs the control signal CON1 to the light source 2 to cause the light source 2 to output a pulse of the monitoring light ML. The threshold voltage control unit 13 controls a value of the threshold voltage Vth output from a threshold voltage generation unit 6 to the comparator 5 by applying a control signal CON2 to the threshold voltage generation unit 6. The timer 14 is configured to be capable of measuring timing. The arithmetic unit 11 can acquire time-series data representing history information of the comparison signal COMP by linking information of the timing output from the timer 14 with a value of the comparison signal COMP output from the comparator 5.

The light source 2 is configured to be capable of outputting the pulsed monitoring light ML. The light source 2 includes a laser diode (LD) module 21 and a drive circuit 22. The drive circuit 22 receives the control signal CON1 from the processing unit 1, and drives the LD module 21 in response to the control signal CON1. Thus, the LD module 21 outputs the pulsed monitoring light ML in response to the control signal CON1.

The optical multiplexer/demultiplexer 3 is configured as, for example, a directional coupler, an optical circulator, or a 3-dB coupler outputs the monitoring light ML input from the light source 2 to the optical transmission line TL, and outputs the return light BL input from the optical transmission line TL to the optical detection unit 4. In FIGS. 2 and 3, a terminal TP of the optical transmission line TL is illustrated. The terminal TP indicates a position of a terminal of the optical transmission line TL or a terminal at a connection destination of the optical transmission line TL. In FIG. 1, an end of the port P23, which is an open end of the optical wavelength filter M2 of the terminal station TS2, corresponds to the terminal TP.

The optical detection unit 4 converts the return light BL input from the optical multiplexer/demultiplexer 3 into an analog electric signal. Specifically, a light receiving element 41 is a photodiode, for example, and converts the return light BL into a current signal CB. In this case, an amplifier 42 is configured as a current-voltage converter (Transimpedance amplifier). The amplifier 42 amplifies the current signal CB, converts the amplified signal into a detection signal VB that is a voltage signal, and outputs the detection signal VB to the comparator 5. The amplifier 42 may be configured as various amplifiers such as a linear amplifier and a logarithmic amplifier.

The comparator 5 compares the detection signal VB output from the optical detection unit 4 with the threshold voltage Vth, and outputs the comparison signal COMP, which is the result of the comparison, to the processing unit 1. As described above, the threshold voltage Vth is generated by the threshold voltage generation unit 6 and applied to the comparator 5.

In FIG. 3, the threshold voltage Vth is input to a non-inverting input terminal of the comparator 5, and the detection signal VB is input to an inverting input terminal. In this case, when the detection signal VB is higher than the threshold voltage Vth (VB>Vth), "0" is output as the comparison signal COMP. When the detection signal VB is lower than the threshold voltage Vth (VB<Vth), "1" is output as the comparison signal COMP. Therefore, by monitoring the value of the comparison signal COMP, the arithmetic unit 11 can determine whether the intensity of the return light BL is greater than or less than a desired value. When the detection signal VB and the threshold voltage Vth are equal (VB=Vth), the comparator 5 may be configured to output either "0" or "1" as appropriate.

Figure 4:
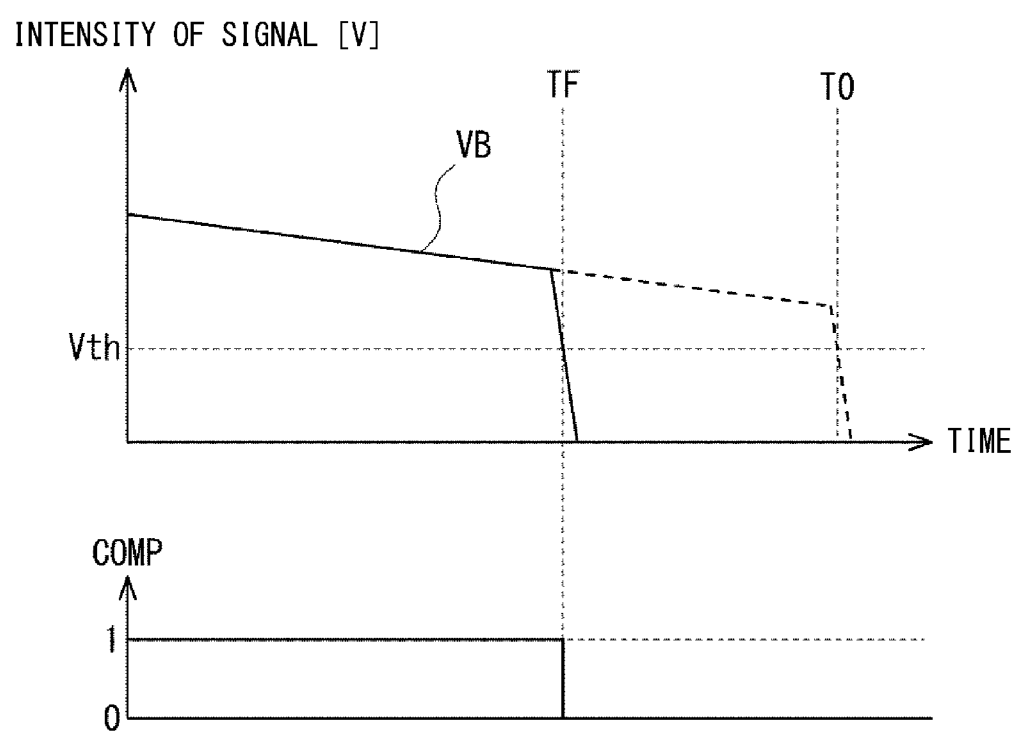
FIG. 4 is a diagram showing an intensity of a return light observed by the optical time domain reflectometer according to the first example embodiment.

FIG. 4 shows the intensity of the detection signal VB of the return light BL observed by the optical time domain reflectometer 100 according to the first example embodiment. As shown in FIG. 4, the intensity of the return light BL reaches the maximum at first, and then decreases as time passes, that is, as the return light BL propagates away from the optical time domain reflectometer 100.

In this case, when the optical transmission line TL is broken, the intensity of the return light BL rapidly decreases. In the example of FIG. 4, the intensity of the detection signal VB rapidly decreases at a timing TF. In this case, the optical transmission line TL is broken at a position corresponding to the timing TF. In the present configuration, by appropriately setting the threshold voltage Vth applied to the comparator 5 and detecting a decrease in the intensity of the detection signal VB, an occurrence of the breakage in the optical transmission line TL and the breakage position can be detected. In FIG. 4, the intensity of the detection signal VB when the optical transmission line TL is not broken is indicated by a broken line. A timing corresponding to the terminal TP of the optical transmission line TL, that is, a timing at which the detection signal VB becomes lower than the threshold voltage Vth of a predetermined value is indicated as T0.

Figure 5:
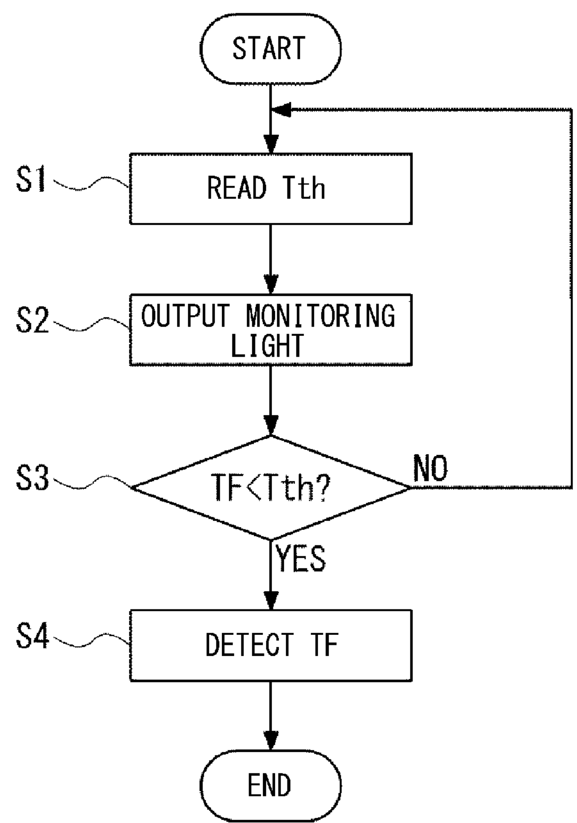
FIG. 5 is a flowchart showing a detection operation of a timing TF in the optical time domain reflectometer according to the first example embodiment.

Next, an operation of detecting the timing TF in the optical time domain reflectometer 100 will be described. FIG. 5 is a flowchart showing the operation of detecting the timing TF in the optical time domain reflectometer 100 according to the first example embodiment.

Step S1

First, the arithmetic unit 11 reads a reference timing Tth. Here, the timing T0 described above is set as the reference timing Tth. The reference timing Tth may be provided to the arithmetic unit 11 in advance or may be provided to the arithmetic unit 11 at an arbitrary timing as appropriate. For example, information indicating the reference timing Tth may be stored in a storage device (not shown in the drawings) disposed in the processing unit 1, and the arithmetic unit 11 may read out the information indicating the reference timing Tth from the storage device as appropriate.

Step S2

The arithmetic unit 11 instructs the pulse generator 12 to output the control signal CON1 to the light source 2, and starts monitoring the comparison signal COMP. The pulse generator 12 outputs the control signal CON1 to the drive circuit 22 of the light source 2. Thus, the drive circuit 22 drives the LD module 21 in response to the control signal CON1, and the LD module 21 outputs the monitoring light ML to the optical transmission line TL.

Step S3

When the monitoring light ML is output to the optical transmission line TL, the return light BL enters the light receiving element 41 through the optical multiplexer/demultiplexer 3 due to backscattering in the optical transmission line TL. The light receiving element 41 converts the return light BL into the current signal CB and outputs the current signal CB to the amplifier 42. The amplifier 42 converts the current signal CB into the detection signal VB and amplifies the converted signal, and outputs the amplified signal to the comparator 5. The comparator 5 compares the detection signal VB output from the optical detection unit 4 with the threshold voltage Vth. As a result of the comparison, when the timing TF is later than the reference timing Tth, the arithmetic unit 11 determines that the optical transmission line TL is not broken, and returns the process to the step S1 in order to constantly monitor the optical transmission line TL. When the timing TF is equal to the reference timing Tth (TF=Tth), the process may proceed to either the step S1 or S5 as appropriate.

Step S4

As a result of the comparison, when the timing TF is earlier than the reference timing Tth, the arithmetic unit 11 detects the timing TF (Also referred to as a first timing) at which the comparison signal COMP changes from "0" (First value) to "1" (Second value).

However, when the position corresponding to the timing TF detected in the step shown in FIG. 5 is determined as the breakage position, the following problem occurs. In FIG. 4, the intensity of the detection signal VB of the return light BL ideally decreases almost vertically at the breakage position (Inflection point of Detection signal VB in FIG. 4). In this case, when the threshold voltage Vth is set anywhere between the intensity of the detection signal VB of the return light BL at the breakage position (Inflection point of Detection signal VB in FIG. 4) and a point at which the intensity of the return light becomes zero, no error occurs in a distance measurement (Detection of timing TF). However, as shown in FIG. 4, the intensity of the detection signal VB actually decreases at a constant slope that is not vertical, so that an error occurs in a measured distance according to a value set as the threshold voltage. Therefore, in order to accurately detect the breakage position (i.e. Timing TF), it is necessary to set the threshold voltage Vth as close to the breakage position (Inflection point of Detection signal VB in FIG. 4) as possible. Thus, in the present example embodiment, a method of setting the threshold voltage Vth in the vicinity of the breakage position will be described below.

Figure 6:
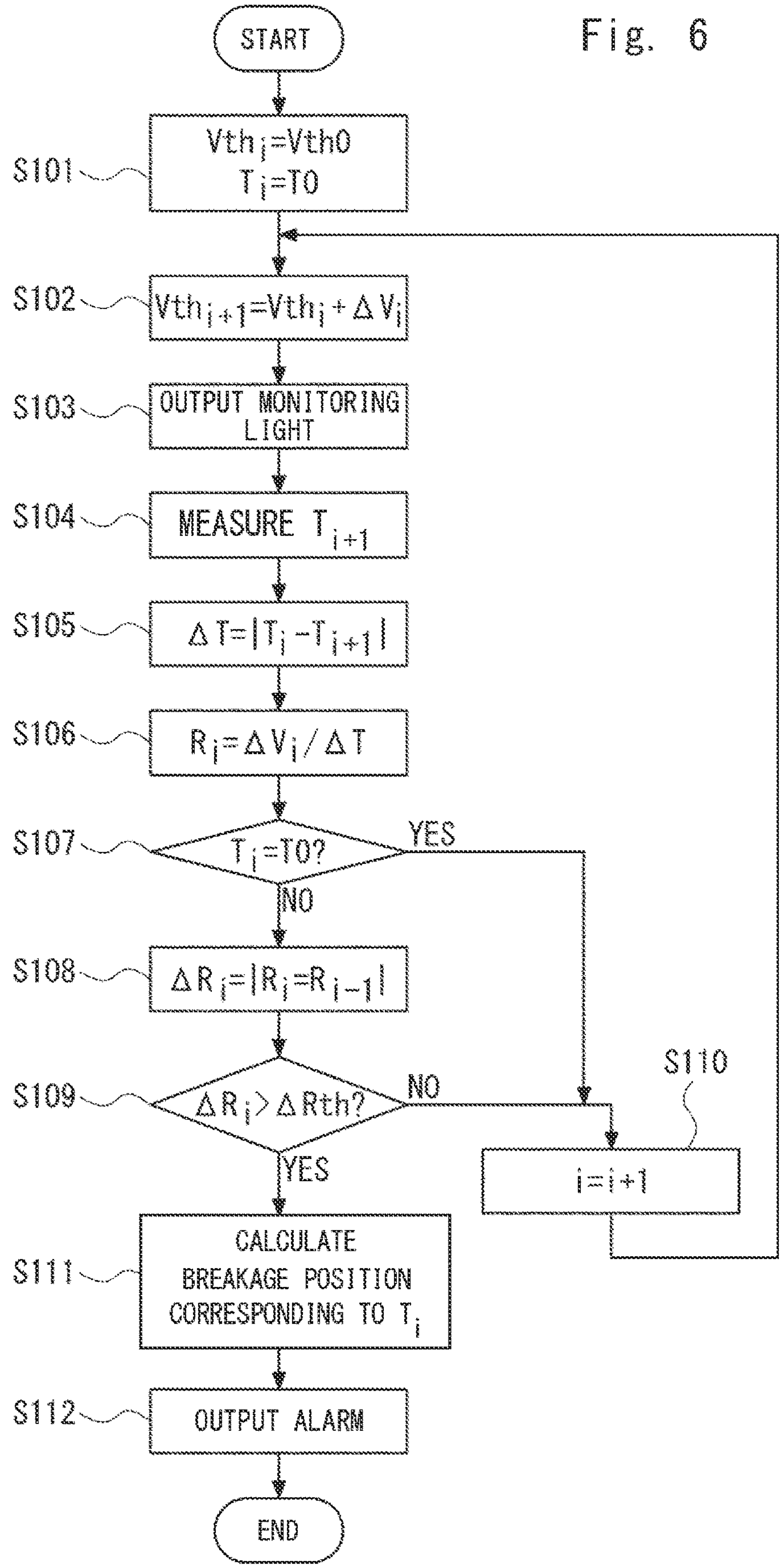
FIG. 6 is a flowchart showing a breakage detection operation of the optical time domain reflectometer according to the first example embodiment.

FIG. 6 is a flowchart showing a breakage detection operation of the optical time domain reflectometer 100 according to the first example embodiment. Hereinafter, a parameter i, which is an integer of 0 or more, is introduced, and an i-th threshold voltage is represented as $Vth_i$ (Also referred to as a first threshold) and an i-th timing is represented as $T_i$ (Also referred to as the first timing).

Step S101 First, the arithmetic unit 11 sets Vth0 (i=0) as an initial value of the threshold voltage $Vth_i$, and sets T0 (i=0) as an initial value of the timing T.

Step S102

Next, the arithmetic unit 11 calculates the (i+1)-th threshold voltage $Vth_{i+1}$ (Also referred to as a second threshold). Here, the (i+1)-th threshold voltage $Vth_i+1$ is expressed by the following equation:

$$Vth_i+1=Vth_i+\Delta V_i(i=0,1,2, \ldots).$$

Note that $\Delta V_i$ may be a constant value or may be changed.

Step S103

In order to output the monitoring light ML, the pulse generator 12 outputs the control signal CON1 to the drive circuit 22. The drive circuit 22 drives the LD module 21 in response to the control signal CON1, so that the monitoring light ML is output from the LD module 21 to the optical transmission line TL. When the monitoring light ML is output to the optical transmission line TL, the return light BL enters the light receiving element 41 through the optical multiplexer/demultiplexer 3 due to the backscattering in the optical transmission line TL. The light receiving element 41 converts the return light BL into the current signal CB and outputs the current signal CB to the amplifier 42. The signal is converted into the detection signal VB and amplified by the amplifier 42, and output to the comparator 5.

Step S104

As described above, the comparator 5 compares the detection signal VB output from the optical detection unit 4 with the threshold voltage $Vth_{i+1}$. The arithmetic unit 11 measures a timing $T_{i+1}$ (Also referred to as a second timing) when the detection signal VB becomes lower than the threshold voltage $Vth_{i+1}$ ($VB<Vth_{i+1}$). The arithmetic unit 11 can specifically measure the timing $T_{i+1}$ by using a count signal output from the timer 14.

Step S105

The arithmetic unit 11 calculates a time difference ΔT between the timing $T_i$ and the timing $T_{i+1}$. The time difference ΔT is expressed by the following equation:

$$\Delta T=|T_i-T_{i+1}|.$$

Step S106

The arithmetic unit 11 calculates a change rate $R_i$ of the detection signal VB during ΔT between the timing $T_i$ and the timing $T_{i+1}$, that is, a slope of a curve showing time variation of the detection signal VB during ΔT between the timing $T_i$ and the timing $T_{i+1}$. The change rate $R_i$ is expressed by the following equation:

$$R_i=\Delta V_i/\Delta T.$$

Step S107

The arithmetic unit 11 determines whether the timing $T_i$ is T0 ($T_i$=T0). when the timing $T_i$ is T0 ($T_i$=T0), the process proceeds to a step S110.

Step S108

When the timing $T_i$ is not T0 ($T_i$≠T0), the arithmetic unit 11 calculates a change rate of $\Delta R_i$ of the change rate R shown in the following equation:

$$\Delta R_i=|R_i-R_{i-1}|.$$

A period corresponding to the change rate $R_i$ is referred to as a second period, and a period corresponding to the change rate $R_{i+1}$ is referred to as a first period.

Step S109

The arithmetic unit 11 determines whether the change rate $\Delta R_i$ is greater than a predetermined threshold ΔRth (Also referred to as a rate threshold)

$$(\Delta R_i>\Delta Rth).$$

Step S110

When the timing $T_i$ is T0 in the step S107 ($T_i$=T0), or when the change rate $\Delta R_i$ is less than the predetermined threshold ΔRth in the step S109 ($\Delta R_i$<ΔRth), the arithmetic unit 11 increments the parameter i to i=i+1, and returns the process to the step S102.

Step S111

When the change rate $\Delta R_i$ is greater than the predetermined threshold ΔRth ($\Delta R_i$>ΔRth), the arithmetic unit 11 detects a position corresponding to the timing $T_i$ as the breakage position of the optical transmission line TL. When the change rate $\Delta R_i$ is equal to the predetermined threshold value ΔRth ($\Delta R_i$=ΔRth), the position corresponding to the timing $T_i$ may be appropriately detected as the breakage position of the optical transmission line TL.

Step S112

The arithmetic unit 11 outputs a signal indicating the occurrence of the breakage in the optical transmission line TL and the detected breakage position. For example, the arithmetic unit 11 outputs a breakage occurrence alarm and the breakage position of the optical transmission line TL to the monitoring control device 1001 shown in FIG. 1.

Thus, the monitoring control device 1001 can notify the user or the like that the alarm has been received. Therefore, according to the present configuration, it is possible to achieve an optical time domain reflectometer capable of constantly monitoring an optical transmission line and automatically detecting an occurrence of breakage and a breakage position when the breakage has occurred in the optical transmission line.

Figure 7:
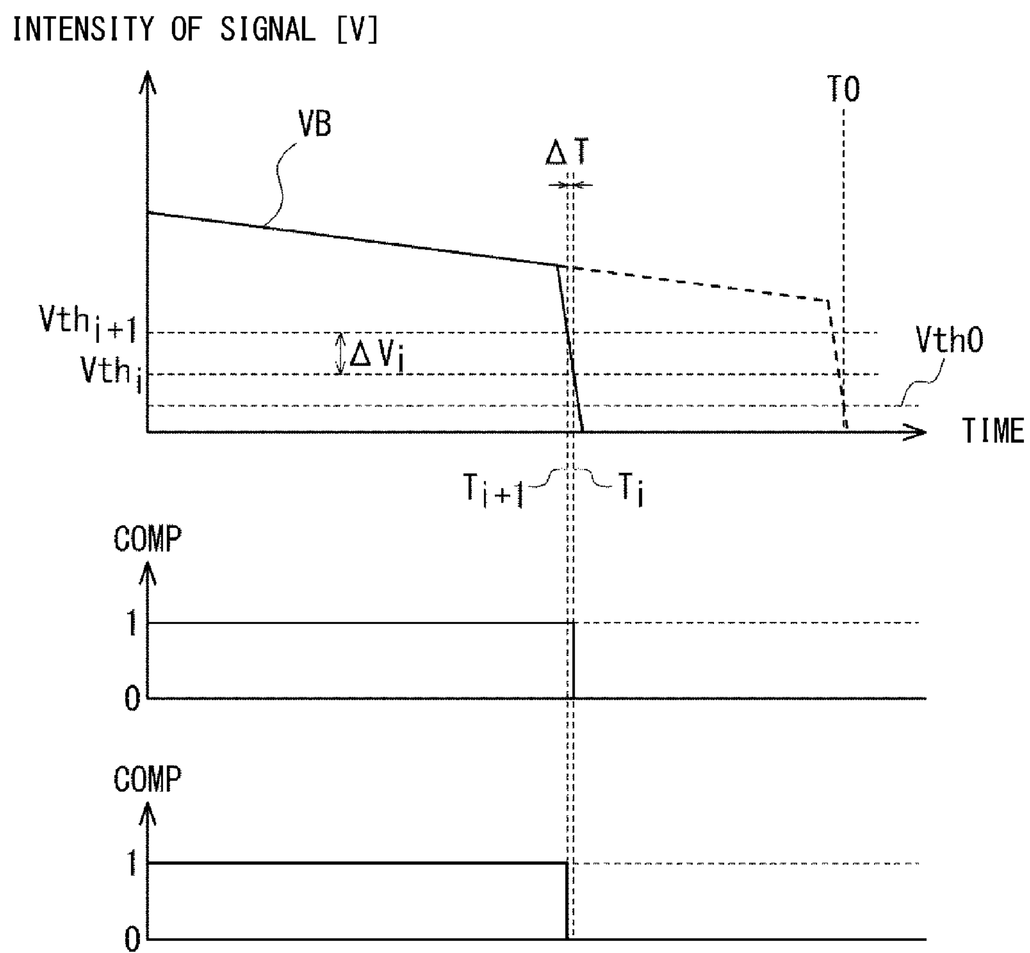
FIG. 7 is a diagram showing a comparison signal when a timing $T_i$ and a timing $T_{i+1}$ are included in a period in which a detection signal is rapidly changing.

Next, a relationship between the change rate R and the breakage position will be described. FIG. 7 shows the comparison signal when the timing $T_i$ and the timing $T_{i+1}$ are included in a period in which the detection signal VB rapidly changes. As shown in FIG. 7, the detection signal VB becomes lower than the threshold voltage $Vth_i$ (First threshold value) at the timing $T_i$ (First timing). The detection signal VB becomes lower than the threshold voltage $Vth_{i+1}$ ($Vth_i+\Delta V_i$, Second threshold value) at the timing $T_{i+1}$ (Second timing). In this case, since both the timing $T_{i+1}$ and the timing $T_i$ are included in the period in which the detection signal VB rapidly changes, the time difference ΔT becomes a relatively small value. Therefore, the change rate R is a relatively large value. That is, when the time difference ΔT is relatively small, that is, when the change rate R is relatively large, it can be understood that the detection signal VB rapidly decreases in the vicinity of the breakage position. However, since the slope of the detection signal is substantially constant in the vicinity of this period, the change rate $\Delta R_i$ (i.e. Second derivative value of Detection signal VB, also referred to as a second change rate.) of the change rate $R_i$ (i.e. First derivative value of Detection signal VB, also referred to as a first change rate.) is a relatively small value. In this case, in order to capture the variation of the detection signal VB with high accuracy, the initial value Vth0 of the threshold voltage Vth is preferably set to a sufficiently small value, for example, a value near zero.

Figure 8:
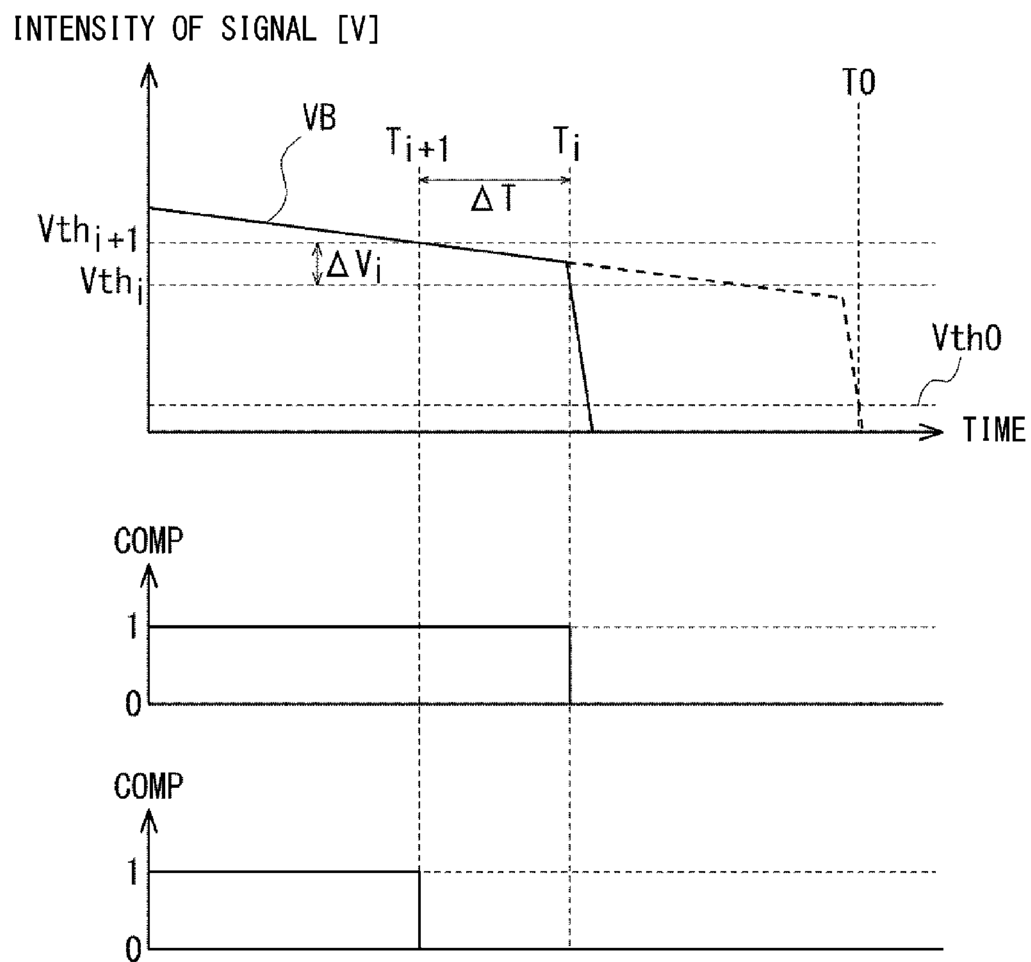
FIG. 8 is a diagram showing the comparison signal when the timing $T_{i+1}$ becomes a timing corresponding to a position closer to a breakage position for the first time.

Thereafter, the steps S102 to S109 are repeatedly executed, and the detection signal VB is compared with the threshold voltage retroactively in time. Here, the operation in the vicinity of the timing when the detection signal VB starts to decrease will be described. FIG. 8 shows the comparison signal when the timing $T_{i+1}$ becomes a timing corresponding to a position closer to the breakage position for the first time. In this case, even when an increment $\Delta V_i$ is constant, the time difference ΔT becomes a relatively large value because there is a period in which the change in the detection signal VB is gradual between the timing $T_i$ and the timing $T_{i+1}$. Therefore, the change rate $R_i$ is a relatively small value. On the other hand, in an adjacent period just before this period, the change rate is a relatively large value, as described above. Therefore, since the value of the change rate $R_i$ in the target period changes relatively largely with respect to the change rate $R_{i-1}$ in the period just before the target period, the value of the change rate $\Delta R_i$ (Second change rate) is relatively large.

That is, as shown in FIGS. 7 and 8, it can be understood that the change rate $\Delta R_i$ varies greatly across the breakage position. Therefore, by appropriately setting the threshold value ΔRth (Change rate threshold) with respect to the change rate $\Delta R_i$, it is possible to detect a period or timing (i.e. Inflection point) in which the change rate $\Delta R_i$ largely changes. Therefore, by detecting a position corresponding to the timing $T_i$ or the timing $T_{i+1}$ in the period in which the change rate $\Delta R_i$ rapidly changes, that is, in the period in which the inflection point exists, as the breakage position, the position where the optical transmission line TL is actually broken can be detected with high accuracy.

When the threshold voltage is controlled to be increased from the initial value Vth0 as in the present example embodiment, it is preferable to determine the position corresponding to the timing $T_i$ just before the inflection point of the curve of the detection signal VB in FIGS. 7 and 8 as the breakage position.

It is also possible to set the initial value Vth0 of the threshold voltage as a large value and control the threshold voltage to be decreased from the initial value Vth0. In this case, the position corresponding to the timing $T_{i+1}$ just after the inflection point of the curve of the detection signal VB is preferably determined as the breakage position.

In general, in a case of controlling the threshold voltage Vth to be decreased from the initial value, when there is a position in which a failure other than the breakage occurs (e.g. FIG. 10), the failure position may be considered as the breakage by mistake. Therefore, in order to detect the breakage regardless of the failure other than the breakage, it is desirable to increase the threshold voltage from the initial value Vth0 as described above.

As described above, in a general optical time domain reflectometer, it is necessary to obtain a curve indicating the intensity change of the return light. Since the intensity of the return light is relatively weak, the curve indicating the intensity change of the return light is obtained by outputting the monitoring light multiple times, observing the intensity change of the return light multiple times, and averaging the observation results. Therefore, a long time is required for the breakage detection in the general optical time domain reflectometer. Further, it is difficult to automatically and accurately detect the breakage position.

On the other hand, in the present configuration, the comparator 5 simply compares the detection signal VB with the threshold voltage and monitors the intensity change of the return light BL, so that the occurrence of the breakage of the optical transmission line and the breakage position can be automatically detected. Further, by repeating outputting the monitoring light and monitoring the return light, it is possible to constantly monitor whether the optical transmission line is broken or not.

Next, a determination of the reference timing Tth will be described. For example, when the optical time domain reflectometer 100 is connected to the optical transmission line TL for the first time or when the optical transmission line TL is replaced, a length of the optical transmission line TL is unknown, so that the Tth has not been determined. Therefore, the reference timing Tth has not been determined yet. Therefore, in order to perform the breakage detection according to the present embodiment, it is necessary to determine the reference timing Tth.

First, the optical time domain reflectometer 100 outputs the monitoring light ML to the optical transmission line TL as in the case of the step S2 shown in FIG. 4.

Next, as in the case of step S3 shown in FIG. 4, the arithmetic unit 11 monitors the comparison signal COMP and detects the timing at which the comparison signal COMP changes from "0" to "1" with reference to the timing at which the monitoring light ML has been output. In this case, assuming that the optical transmission line TL is not broken, the intensity of the return light BL rapidly decreases at the timing corresponding to the terminal TP of the optical transmission line TL. Therefore, the arithmetic unit 11 can determine the detected timing T0 as the reference timing Tth. The arithmetic unit 11 may hold the reference timing Tth, or write the information indicating the reference timing Tth in the storage device or the like described above, and read the information indicating the reference timing Tth as appropriate. Further, as described above, a timing earlier than the detected timing by the predetermined value α may be held as the reference timing Tth.

Second Example Embodiment

An optical transmission apparatus according to a second example embodiment will be described. Here, an operation of detecting a change in a length of the optical transmission line TL using the optical time domain reflectometer 100 will be described.

For example, it can be assumed that the length of the optical transmission line to be monitored by the optical time domain reflectometer changes due to maintenance work or the like. For example, when the optical transmission line is replaced and thereby becomes longer and the optical time domain reflectometer 100 performs the operation shown in FIGS. 5 and 6, the intensity of the return light BL rapidly decreases at a timing later than the reference timing Tth (i.e. TF>Tth). In this case, the optical time domain reflectometer 100 can automatically detect that the length of the optical transmission line TL has increased.

At this time, since the reference timing Tth does not correspond to the actual length of the optical transmission line TL, it is necessary to correct the reference timing Tth. In this case, the optical time domain reflectometer 100 resets the reference timing Tth and automatically determines the reference timing Tth as described in the first example embodiment, so that the reference timing Tth corresponding to the actual length of the optical transmission line TL can be determined.

As described above, according to the present configuration, when the length of the optical transmission line TL changes, the reference timing Tth can be automatically reset.

Third Example Embodiment

An optical transmission apparatus according to a third example embodiment will be described. Here, an operation of distinguishing modes of the failure caused in the optical transmission line TL using the optical time domain reflectometer 100 will be described. As a failure mode of the optical transmission line TL, the breakage and a failure in which the intensity of the return light BL decreases due to deterioration or the like of the optical transmission line TL other than the breakage can be considered. In this case, although the optical transmission line TL is not broken, it is conceivable that the intensity of the return light decreases at the position where the deterioration has occurred.

Therefore, an initial threshold voltage VthA (Also referred to as a first threshold value) for detecting the breakage of the optical transmission line TL and an initial threshold voltage VthB (Also referred to as a third threshold value) for detecting the deterioration of the optical transmission line TL are set, and the failure mode is distinguished by setting VthA<VthB. Here, the value of the detection signal VB corresponding to the intensity of the return light BL at the terminal TP of the optical transmission line TL is set as the value of the threshold voltage VthB.

Figure 9:
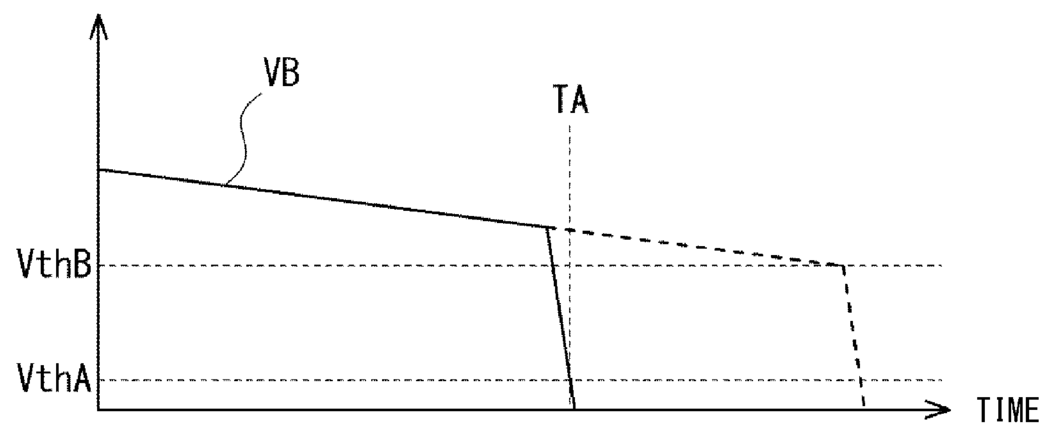
FIG. 9 is a diagram showing an intensity change of the return light when the optical transmission line has been broken in a third example embodiment.

FIG. 9 shows the intensity change of the return light BL when the optical transmission line TL has been broken in the third example embodiment. As shown in FIG. 9, the intensity of the return light BL becomes lower than the initial threshold voltage VthA at the position where the breakage has occurred (Timing TA). In this case, as in FIG. 6, the breakage position can be detected with high accuracy.

Figure 10:
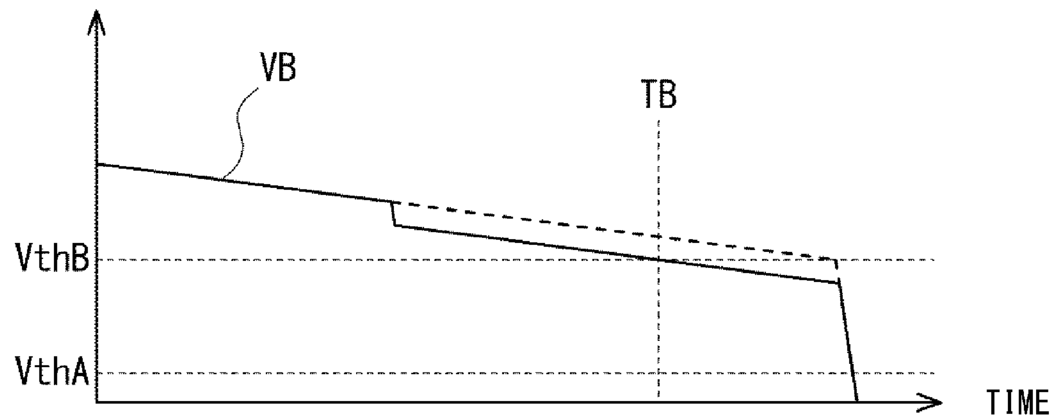
FIG. 10 is a diagram showing the intensity change of the return light when the optical transmission line is not broken but has been deteriorated in the third example embodiment.

FIG. 10 shows the intensity change of the return light BL when the optical transmission line TL is not broken but has been deteriorated in the third example embodiment. As shown in FIG. 10, at a timing TB, the detection signal VB becomes lower than the threshold voltage VthB, but remains higher than the threshold voltage VthA. Here, the timing TB at which the detection signal VB becomes lower than the threshold voltage VthB is also referred to as the second timing. In this case, by detecting that there is the timing at which the detection signal VB becomes lower than the threshold voltage VthB but remains higher than the threshold voltage VthA, the arithmetic unit 11 can detect that the failure other than the breakage such as deterioration has occurred in the optical transmission line TL.

In other words, according to the present configuration, by appropriately setting the two initial threshold voltages, it is possible to separately detect the failure modes such as breakage and deterioration that may occur in the optical transmission line TL.

Fourth Example Embodiment

An optical transmission apparatus according to a fourth example embodiment will be described. Here, an operation of the optical time domain reflectometer 100 for detecting an instantaneous interruption of the optical signal in the optical transmission line TL will be described. In the optical transmission line TL, the instantaneous interruption of the optical signal may occur due to, for example, an influence of a lightning strike. In the present example embodiment, the instantaneous interruption of the optical signal is detected by monitoring the intensity of the return light BL.

The intensity of the return light BL is continuously greatly reduced when the optical transmission line TL has been broken, while the intensity of the return light BL has been temporarily reduced when the instantaneous interruption of the optical signal has occurred. Therefore, it is considered that the instantaneous interruption of the optical signal can be detected by detecting a temporary decrease in the intensity of the return light BL.

As described in the above example embodiments, since the optical time domain reflectometer 100 constantly detects the optical transmission line TL, it continuously detects the timing TF. When the optical transmission line TL has been broken, the timing TF becomes earlier than the reference timing Tth (TF<Tth) after the breakage occurs. Thereafter, even when the monitoring of the optical transmission line TL is continued, the timing TF remains at the timing earlier than the reference timing Tth (TF<Tth).

Figure 11:
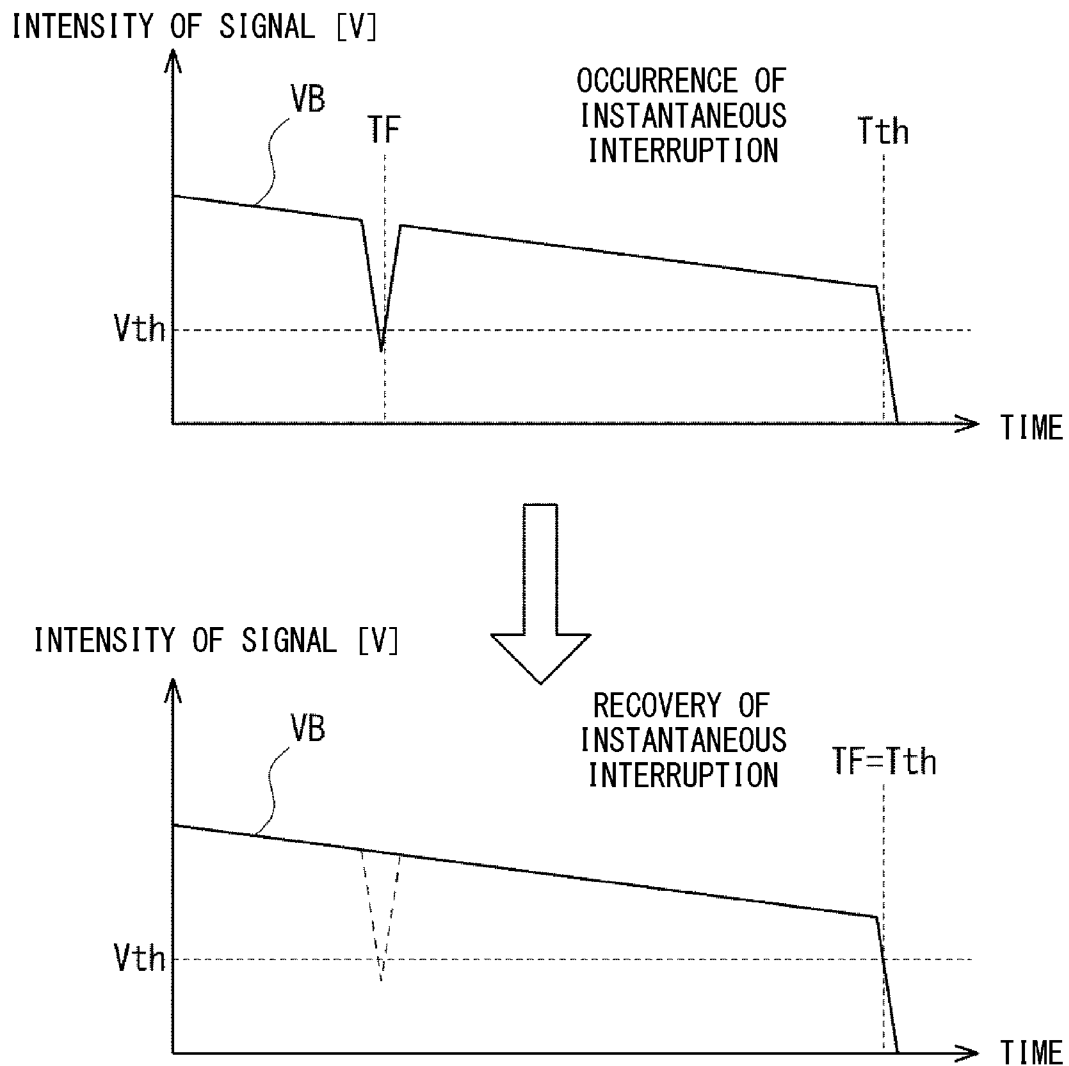
FIG. 11 is a diagram showing the intensity of the return light when an instantaneous interruption of an optical signal has occurred and the intensity of the return light when the instantaneous interruption of the optical signal has been recovered.

On the other hand, when the instantaneous interruption of the optical signal has occurred in the optical transmission line TL, the timing TF shows a variation other than that in the case of the breakage of the optical transmission line TL. FIG. 11 shows the intensity of the return light BL when the instantaneous interruption of the optical signal has occurred and the intensity of the return light BL when the instantaneous interruption of the optical signal has been recovered. When the instantaneous interruption of the optical signal occurs in the optical transmission line TL, the timing TF at the position of time when the instantaneous interruption has occurred becomes a timing earlier than the reference timing Tth (TF<Tth). Thereafter, when the instantaneous interruption is recovered, the return light BL reaches the terminal TP of the optical transmission line TL without being weakened in the middle, so that the value of the timing TF increases, and the timing becomes the same as or later than the reference timing Tth (TF>Tth).

Therefore, when the timing TF once becomes earlier than the reference timing Tth (TF<Tth) and then the value of the timing TF increases to become the same as the reference timing Tth or the timing later than the reference timing Tth (TF>Tth), the optical time domain reflectometer 100 can detect that the instantaneous interruption of the optical signal instead of the breakage has occurred in the optical transmission line TL.

When the occurrence and recovery of the instantaneous interruption of the optical signal has been detected, the optical time domain reflectometer 100 may notify, for example, the monitoring control device 1001 of the occurrence of the instantaneous interruption of the optical signal. Further, the optical time domain reflectometer 100 may also notify that the instantaneous interruption of the optical signal has been already recovered.

According to the present configuration, the occurrence of the instantaneous interruption of the optical signal can be detected while distinguishing it from the breakage or deterioration of the optical transmission line TL. Thus, the user or the like who is notified of the occurrence of the instantaneous interruption can recognize that it is a temporary phenomenon that does not require maintenance work unlike the breakage or deterioration of the optical transmission line TL.

When the instantaneous interruption of the optical signal frequently occurs in the same optical transmission line, it is possible to take measures for preventing the occurrence of the instantaneous interruption other than measures for preventing the failure such as the breakage or deterioration.

Fifth Example Embodiment

An optical transmission apparatus according to a fifth example embodiment will be described. Here, a determination of the increment $\Delta V_i$ of the detection signal VB in the optical time domain reflectometer 100 will be described. When the optical transmission line TL has been broken, depending on a condition of a broken cross section, the monitoring light is reflected at an end face, and the return light may have a peak.

Figure 12:
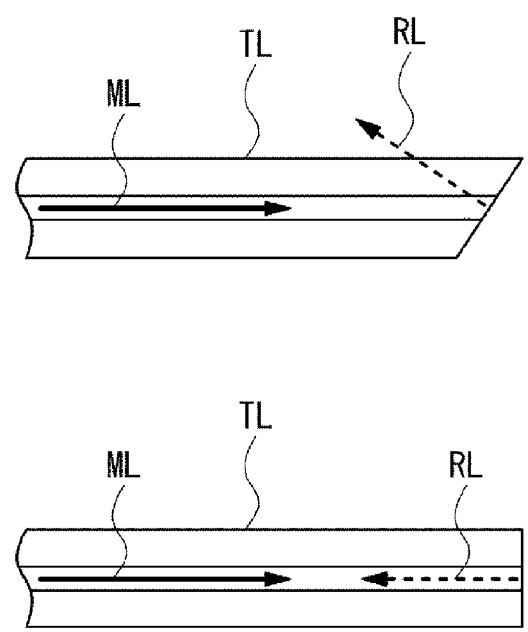
FIG. 12 is a diagram showing a relationship between a cross section where the optical transmission line is broken and reflection of the monitoring light.

FIG. 12 shows a relationship between the cross section where the optical transmission line TL is broken and the reflection of the monitoring light. When the breakage surface tilts with respect to the extending direction of the optical transmission line TL, a part of the monitoring light ML is reflected in a direction not parallel to the extending direction of the optical transmission line TL, so that an influence of a reflected light RL included in the return light BL becomes small. On the other hand, when the breakage surface is normal to the extending direction of the optical transmission line TL, the monitoring light ML is reflected in the reverse direction, so that the intensity of the return light BL has a peak due to the influence of the reflected light RL.

Figure 13:
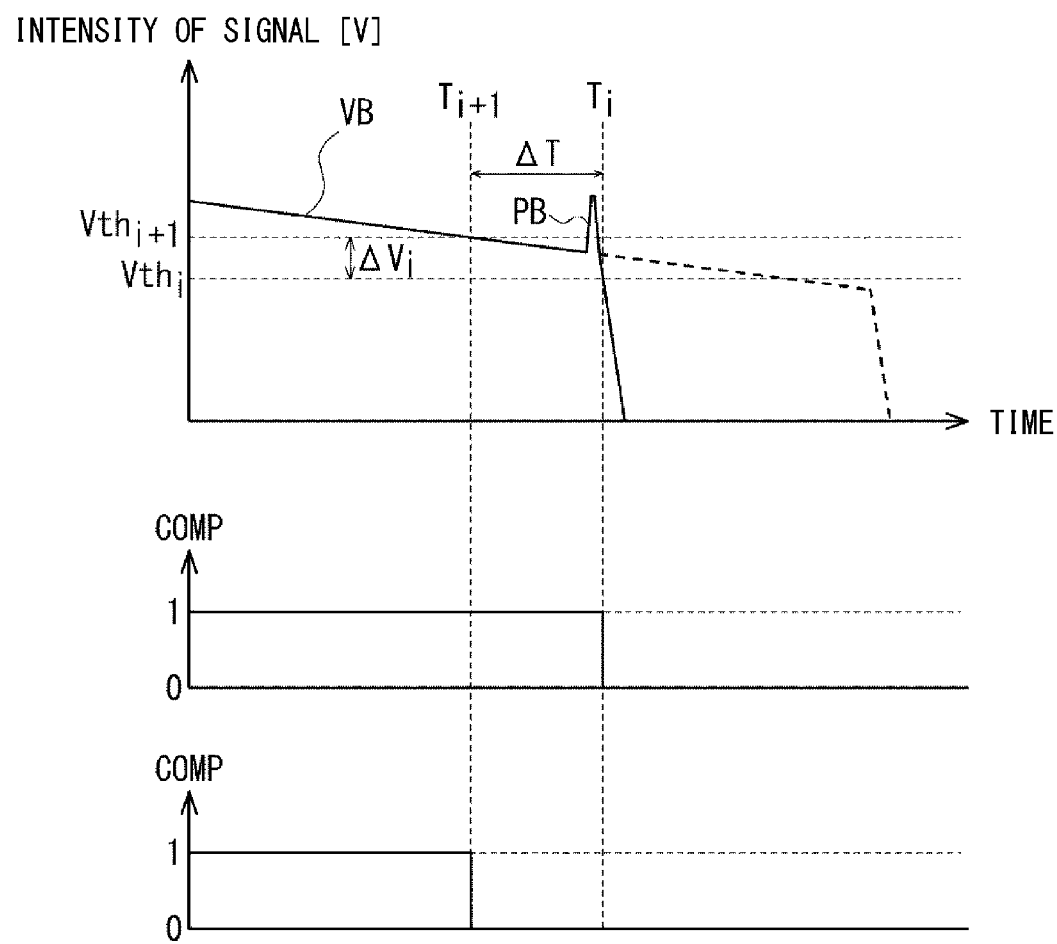
FIG. 13 is a diagram showing peaks of the intensity change of the return light due to an influence of a reflected light.

FIG. 13 shows a peak of the intensity change of the return light BL due to the influence of the reflected light. As shown in FIG. 13, at the timing corresponding to the position where the optical transmission line TL is broken, the intensity of the return light BL has a peak PB due to the influence of the reflected light RL. Since the peak PB is caused by the return light reflected at the breakage surface, it becomes a sharp peak having a relatively narrow width.

In the present example embodiment, by setting the increment $\Delta V_i$ in such a manner that the time difference $\Delta T$ corresponding to the increment $\Delta V_i$ of the detection signal VB is sufficiently wider than the width of the peak PB, the breakage position can be detected in the same manner as in the first example embodiment without being affected by the peak PB.

Even when the timing $T_{i+1}$ shown in FIG. 13 overlaps with the peak PB, the change rate R becomes a larger value. However, by detecting the timing at which the change rate becomes small thereafter, the breakage position can be detected with high accuracy as in the case of the first example embodiment.

Further, even when the timing $T_i$ shown in FIG. 13 overlaps with the peak PB, the change rate R becomes a small value. As a result, the position corresponding to the timing $T_{i+1}$ not overlapping with the peak PB can be detected as the breakage position.

Sixth Example Embodiment

Figure 14:
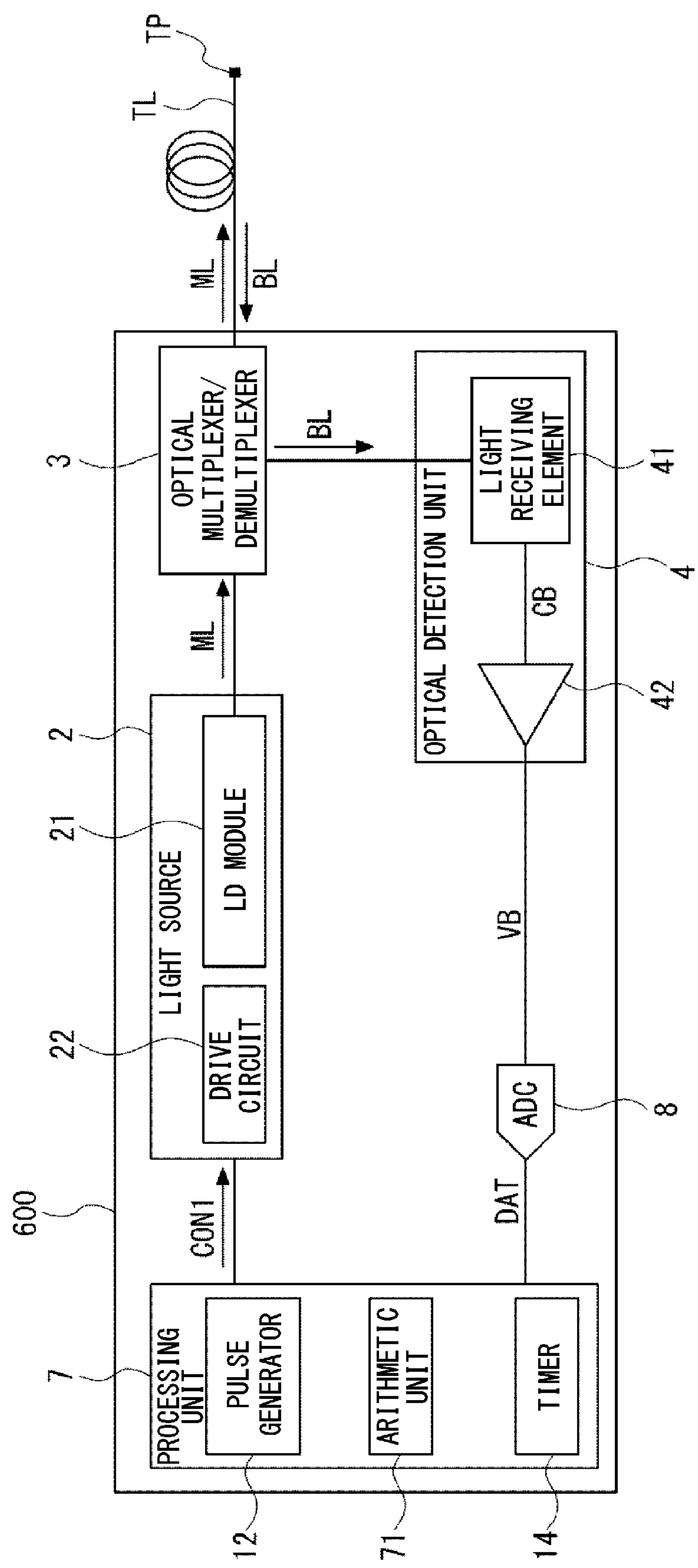
FIG. 14 is a diagram schematically showing a configuration of an optical time domain reflectometer according to a sixth example embodiment.

An optical transmission apparatus according to a sixth example embodiment will be described. FIG. 14 schematically shows a configuration of an optical time domain reflectometer 600 according to the sixth example embodiment. The optical time domain reflectometer 600 has a configuration in which the processing unit 1 and the comparator 5 of the optical time domain reflectometer 100 according to the first example embodiment are replaced with a processing unit 7 and an analog to digital (A/D) converter 8, respectively.

The A/D converter 8 converts the detection signal VB, which is an analog signal output from the amplifier 42, into an output signal DAT, which is a digital signal.

The processing unit 7 has a configuration in which the arithmetic unit 11 of the processing unit 1 is replaced with the arithmetic unit 71 and the threshold voltage control unit 13 is removed.

The arithmetic unit 71 compares the output signal DAT with a predetermined threshold value with reference to the output signal DAT that is the digital signal indicating the value of the detection signal VB. That is, as described in the above example embodiments, the analog signal processing for comparing the detection signal VB and the threshold voltage Vth performed by the comparator 5 can be performed by an equivalent processing in which the digital signal is replaced.

As described above, according to the present configuration, the same operation as that of the optical time domain reflectometer 100 according to the above-described embodiment can be performed. Further, in the present configuration, since the same processing as that of the optical time domain reflectometer 100 according to the above-described example embodiment can be performed by the data processing in the arithmetic unit 71, it is possible to change a program or a parameter for performing the data processing and to easily change the threshold value.

Other Example Embodiments

The present invention is not limited to the above-described example embodiments, and can be modified as appropriate without departing from the scope of the invention. For example, the configuration of the processing unit, the light source, and the optical detection unit according to the above-described example embodiment is merely exemplary, and other configurations may be used as appropriate.

While the present invention has been described above with reference to example embodiments, the present invention is not limited to the example embodiments stated above.

(Supplementary Note 1) An optical time domain reflectometer including: a light source configured to output a monitoring light; an optical detection unit configured to detect a return light from an optical transmission line and output a detection signal indicating an intensity of the return light; an optical multiplexer/demultiplexer configured to output the monitoring light input from the light source to the optical transmission line, and output the return light input from the optical transmission line to the optical detection unit; a processing unit configured to detect a first timing at which a value of the detection signal becomes less than a first threshold value, detect a second timing at which the value of the detection signal becomes less than a second threshold value different from the first threshold value, and calculate a first change rate which is a change rate of the detection signal in a period between the first timing and the second timing, in which the processing unit: calculates the first change rates for a plurality of periods by changing the first threshold value and the second threshold value; and, when a second change rate that is a change rate between the first change rate in a first period and the first change rate in a second period adjacent to the first period is greater than a change rate threshold value, detects a position corresponding to either the first timing or the second timing in the first period as a breakage position of the optical transmission line.

(Supplementary Note 2) The optical time domain reflectometer according to Supplementary Note 1, in which the second threshold value in the first period is equal to the first threshold value in the second period.

(Supplementary Note 3) The optical time domain reflectometer according to Supplementary Note 1 or 2, in which the second threshold value $Vth_i$ is expressed by $Vth_{i+1}=Vth_i+\Delta V_i$ or $Vth_{i+1}=Vth_i-\Delta V_i$, in which i is defined as an integer equal to or more than 0, the timing at which the value of the detection signal becomes less than the first threshold value $Vth_i$ is defined as $T_i$, the timing at which the value of the detection signal becomes less than the second threshold value $Vth_{i+1}$ is defined as $T_{i+1}$, an absolute value of a difference between the first threshold value $Vth_i$ and the second threshold value $Vth_{i+1}$ is defined as $\Delta V_i$, and an initial value of the first threshold value $Vth_i$ when i=0 is defined as Vth0.

(Supplementary Note 4) The optical time domain reflectometer according to Supplementary Note 3, in which, when i is equal to or greater than one, the first change rate in the first period is defined as $R_{i-1}$, and the first change rate in the second period is defined as $R_i$, the second change rate $\Delta R_i$ is expressed by $\Delta R_i=|R_i-R_{i-1}|$.

(Supplementary Note 5) 5. The optical time domain reflectometer according to claim 4, wherein, when the second change rate $\Delta R_i$ becomes greater than the change rate threshold value, the processing unit: detects a position corresponding to the first timing as the breakage position of the optical transmission line in the case of $Vth_{i+1}=Vth_i+\Delta V_i$, and detects a position corresponding to the second timing as the breakage position of the optical transmission line in the case of $Vth_{i+1}=Vth_i-\Delta V_i$.

(Supplementary Note 6) The optical time domain reflectometer according to Supplementary Note 2, in which, when the detection signal is greater than the first threshold value and less than a third threshold value, the processing unit detects that a failure different from the breakage has occurred in the optical transmission line.

(Supplementary Note 7) The optical time domain reflectometer according to Supplementary Note 6, in which, when the detection signal is greater than the first threshold value and less than the third threshold value, the processing unit detects that the optical transmission line has deteriorated.

(Supplementary Note 8) The optical time domain reflectometer according to Supplementary Note 6, in which, when the detection signal becomes less than the third threshold value and then the detection signal becomes greater than the third threshold value, the processing unit detects that an instantaneous interruption of the optical signal transmitted through the optical transmission line has occurred.

(Supplementary Note 9) The optical time domain reflectometer according to Supplementary Note 7 or 8, in which the third threshold value is a value corresponding to the intensity of the return light at an end of the optical transmission line.

(Supplementary Note 10) The optical time domain reflectometer according to any one of Supplementary Notes 1 to 9, in which, when the return light is returned from a position farther than a predetermined length of the optical transmission line, the processing unit sets a distance between a position detected as the breakage position and the optical time domain reflectometer as a length of the optical transmission line.

(Supplementary Note 11) A test method of an optical transmission line including: outputting a monitoring light to an optical transmission line; detecting a return light from the optical transmission line, and outputting a detection signal indicating an intensity of the return light; and detecting a first timing at which a value of the detection signal becomes less than a first threshold value, detecting a second timing at which the value of the detection signal becomes less than a second threshold value different from the first threshold value, and calculating a first change rate which is a change rate of the detection signal in a period between the first timing and the second timing, in which the first change rates for a plurality of periods are calculated by changing the first threshold value and the second threshold value; and, when a second change rate that is a change rate between the first change rate in a first period and the first change rate in a second period adjacent to the first period is greater than a change rate threshold value, a position corresponding to either the first timing or the second timing in the first period is detected as a breakage position of the optical transmission line.

(Supplementary Note 12) A test system of an optical transmission line including: a first optical transmission apparatus configured to transmit and receive optical signals; a second optical transmission apparatus configured to transmit and receive the optical signals; an optical transmission line connecting the first optical transmission apparatus and the second optical transmission apparatus; and an optical time domain reflectometer connected to the first optical transmission apparatus and configured to test the optical transmission line; in which the optical time domain reflectometer includes: a light source configured to output a monitoring light; an optical detection unit configured to detect a return light from the optical transmission line and output a detection signal indicating an intensity of the return light; an optical multiplexer/demultiplexer configured to output the monitoring light input from the light source to the optical transmission line, and output the return light input from the optical transmission line to the optical detection unit; a processing unit configured to detect a first timing at which a value of the detection signal becomes less than a first threshold value, detect a second timing at which the value of the detection signal becomes less than a second threshold value different from the first threshold value, and calculate a first change rate which is a change rate of the detection signal in a period between the first timing and the second timing, in which the processing unit: calculates the first change rates for a plurality of periods by changing the first threshold value and the second threshold value; and, when a second change rate that is a change rate between the first change rate in a first period and the first change rate in a second period adjacent to the first period is greater than a change rate threshold value, detects a position corresponding to either the first timing or the second timing in the first period as a breakage position of the optical transmission line.

Although the present invention has been described above with reference to the embodiments, the present invention is not limited by the foregoing. Various changes in the structure and details of the present invention can be understood by a person skilled in the art within the scope of the invention.

This application claims priority on the basis of Japanese Patent Application No. 2018-161342, filed Aug. 30, 2018, the entire disclosure of which is incorporated herein by reference.

REFERENCE SIGNS LIST

1, 7 PROCESSING UNITS
2 LIGHT SOURCE
3 OPTICAL MULTIPLEXER/DEMULTIPLEXER
4 OPTICAL DETECTION UNIT
5 COMPARATOR
6 THRESHOLD VOLTAGE GENERATION UNIT
8 A/D CONVERTER
11 ARITHMETIC UNIT
12 PULSE GENERATOR
13 THRESHOLD VOLTAGE CONTROL UNIT
14 TIMER
21 LD MODULE
22 DRIVE CIRCUIT
41 LIGHT RECEIVING ELEMENT
42 AMPLIFIER
71 ARITHMETIC UNIT
100, 200, 300, 600 OPTICAL TIME DOMAIN REFLECTOMETERS
1000 OPTICAL COMMUNICATION NETWORK
1001 MONITORING CONTROL DEVICE
BL RETURN LIGHT
CB CURRENT SIGNAL
COMP COMPARISON SIGNAL
CON1, CON2 CONTROL SIGNALS
M1, M2 WAVELENGTH FILTERS
ML MONITOR LIGHT
P 11 TO P 13, P 21 TO P 23 PORTS
TL OPTICAL TRANSMISSION LINE
TP TERMINAL
TR1, TR2 OPTICAL TRANSMISSION APPARATUSES
TS1, TS2 TERMINAL STATIONS
VB DETECTION SIGNAL

What is claimed is:

1. An optical time domain reflectometer comprising:
a light source configured to output a monitoring light;
an optical detection unit configured to detect a return light from an optical transmission line and output a detection signal indicating an intensity of the return light;
an optical multiplexer/demultiplexer configured to output the monitoring light input from the light source to the optical transmission line, and output the return light input from the optical transmission line to the optical detection unit;
a processing unit configured to detect a first timing at which a value of the detection signal becomes less than a first threshold value, detect a second timing at which the value of the detection signal becomes less than a second threshold value different from the first threshold value, and calculate a first change rate which is a change rate of the detection signal in a period between the first timing and the second timing, wherein the processing unit:
calculates the first change rates for a plurality of periods by changing the first threshold value and the second threshold value; and,
when a second change rate that is a change rate between the first change rate in a first period and the first change rate in a second period adjacent to the first period is greater than a change rate threshold value, detects a position corresponding to either the first timing or the second timing in the first period as a breakage position of the optical transmission line.

2. The optical time domain reflectometer according to claim 1, wherein the second threshold value in the first period is equal to the first threshold value in the second period.

3. The optical time domain reflectometer according to claim 2, wherein, when the detection signal is greater than the first threshold value and less than a third threshold value, the processing unit detects that a failure different from the breakage has occurred in the optical transmission line.

4. The optical time domain reflectometer according to claim 3, wherein, when the detection signal is greater than the first threshold value and less than the third threshold value, the processing unit detects that the optical transmission line has deteriorated.

5. The optical time domain reflectometer according to claim 4, wherein the third threshold value is a value corresponding to the intensity of the return light at an end of the optical transmission line.

6. The optical time domain reflectometer according to claim 3, wherein, when the detection signal becomes less than the third threshold value and then the detection signal becomes greater than the third threshold value, the processing unit detects that an instantaneous interruption of the optical signal transmitted through the optical transmission line has occurred.

7. The optical time domain reflectometer according to claim 1, wherein the second threshold value $Vth_i$ is expressed by $Vth_{i+1}=Vth_i+\Delta V_i$ or $Vth_{i+1}=Vth_i-\Delta V_i$, where i is defined as an integer equal to or more than 0, the timing at which the value of the detection signal becomes less than the first threshold value $Vth_i$ is defined as $T_i$, the timing at which the value of the detection signal becomes less than the second threshold value $Vth_{i+1}$ is defined as $T_{i+1}$, an absolute value of a difference between the first threshold value $Vth_i$ and the second threshold value $Vth_{i+1}$ is defined as $\Delta V_i$, and an initial value of the first threshold value $Vth_i$ when i=0 is defined as Vth0.

8. The optical time domain reflectometer according to claim 7, wherein, when i is equal to or greater than one, the first change rate in the first period is defined as Ro, and the first change rate in the second period is defined as $R_i$, the second change rate $\Delta R_i$ is expressed by $\Delta R_i=|R_i-R_{i-1}|$.

9. The optical time domain reflectometer according to claim 8, wherein, when the second change rate $\Delta R_i$ becomes greater than the change rate threshold value, the processing unit:

detects a position corresponding to the first timing as the breakage position of the optical transmission line in the case of $Vth_{i+1}=Vth_i+\Delta V_i$, and detects a position corresponding to the second timing as the breakage position of the optical transmission line in the case of $Vth_{i+1}=Vth_i-\Delta V_i$.

10. The optical time domain reflectometer according to claim 1, wherein, when the return light is returned from a position farther than a predetermined length of the optical transmission line, the processing unit sets a distance between a position detected as the breakage position and the optical time domain reflectometer as a length of the optical transmission line.

11. A test method of an optical transmission line comprising:

outputting a monitoring light to an optical transmission line;

detecting a return light from the optical transmission line, and outputting a detection signal indicating an intensity of the return light; and detecting a first timing at which a value of the detection signal becomes less than a first threshold value, detecting a second timing at which the value of the detection signal becomes less than a second threshold value different from the first threshold value, and calculating a first change rate which is a change rate of the detection signal in a period between the first timing and the second timing, wherein the first change rates for a plurality of periods are calculated by changing the first threshold value and the second threshold value; and, when a second change rate that is a change rate between the first change rate in a first period and the first change rate in a second period adjacent to the first period is greater than a change rate threshold value, a position corresponding to either the first timing or the second timing in the first period is detected as a breakage position of the optical transmission line.

12. A test system of an optical transmission line comprising:

a first optical transmission apparatus configured to transmit and receive optical signals;

a second optical transmission apparatus configured to transmit and receive the optical signals;

an optical transmission line connecting the first optical transmission apparatus and the second optical transmission apparatus; and an optical time domain reflectometer connected to the first optical transmission apparatus and configured to test the optical transmission line; wherein the optical time domain reflectometer comprises:

a light source configured to output a monitoring light;

an optical detection unit configured to detect a return light from the optical transmission line and output a detection signal indicating an intensity of the return light;

an optical multiplexer/demultiplexer configured to output the monitoring light input from the light source to the optical transmission line, and output the return light input from the optical transmission line to the optical detection unit;

a processing unit configured to detect a first timing at which a value of the detection signal becomes less than a first threshold value, detect a second timing at which the value of the detection signal becomes less than a second threshold value different from the first threshold value, and calculate a first change rate which is a change rate of the detection signal in a period between the first timing and the second timing, wherein the processing unit:

calculates the first change rates for a plurality of periods by changing the first threshold value and the second threshold value; and, when a second change rate that is a change rate between the first change rate in a first period and the first change rate in a second period adjacent to the first period is greater than a change rate threshold value, detects a position corresponding to either the first timing or the second timing in the first period as a breakage position of the optical transmission line.

* * * * *